United States Patent [19]

Miklas

[11] 4,216,763
[45] Aug. 12, 1980

[54] TOASTER/OVEN ACCESSORY PAN WITH HANDLE

[75] Inventor: Frank C. Miklas, Allentown, Pa.

[73] Assignee: General Electric Company, New York, N.Y.

[21] Appl. No.: 6,930

[22] Filed: Jan. 26, 1979

[51] Int. Cl.³ .................. F23L 3/00; F23L 11/00; F23L 13/00
[52] U.S. Cl. .................. 126/275 R; 220/4 E; 220/94 A; 99/426
[58] Field of Search ............ 220/4 R, 4 B, 4 E, 94 A; 126/19 R, 388–390, 19 M, 275 R; 99/419, 422, 426

[56] References Cited

U.S. PATENT DOCUMENTS

| | | | |
|---|---|---|---|
| 641,273 | 1/1900 | Coon | 220/4 R |
| 891,085 | 6/1908 | Leahy | 220/4 R |
| 1,288,799 | 12/1918 | Donley | 220/4 B |
| 2,232,738 | 2/1941 | Serr | 220/94 R |
| 2,722,173 | 11/1955 | Cunningham | 220/4 B |
| 3,987,719 | 10/1976 | Kian | 126/275 R |

*Primary Examiner*—George T. Hall
*Attorney, Agent, or Firm*—Leonard J. Platt; George R. Powers; John F. Cullen

[57] ABSTRACT

A toaster/oven accessory pan sized to cook small food items (eggs, etc.) comprises a flat major panel, integral upstanding sidewalls, a peripheral flange extending from and surrounding the sidewalls, and two handles integral with the peripheral flange and defining a slot opening for receiving the tines of a fork to lift and carry the pan. The bottoms of the fork tines engage a tab of the handle partially defining the slot opening, the tops of the fork tines engage a downstruck stiffening bead formed in the peripheral flange adjacent the slot opening and the ends of the tines abut a sidewall juxtaposed the handle. The peripheral flange is provided with grooves extending about two opposed corners and beads extending about the remaining two opposed corners, and a second identical toaster/oven accessory pan can be inverted and nest on the first pan as a cover, and in particular, the beads and grooves nest. The toaster/oven accessory pan is fabricated of aluminum, and both interior and exterior surfaces are coated with black Teflon, which is heat absorptive.

13 Claims, 4 Drawing Figures

U.S. Patent  Aug. 12, 1980  4,216,763
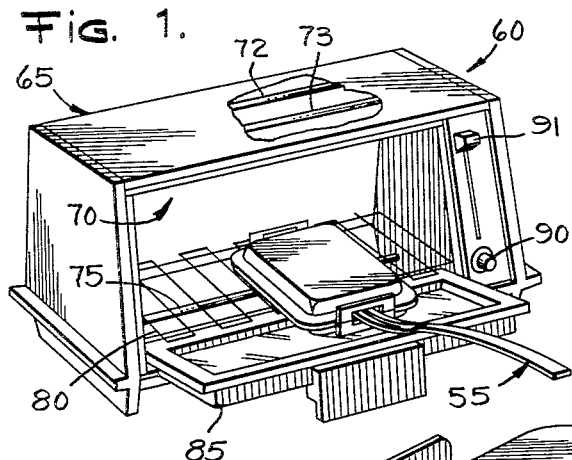
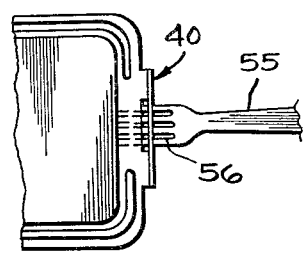
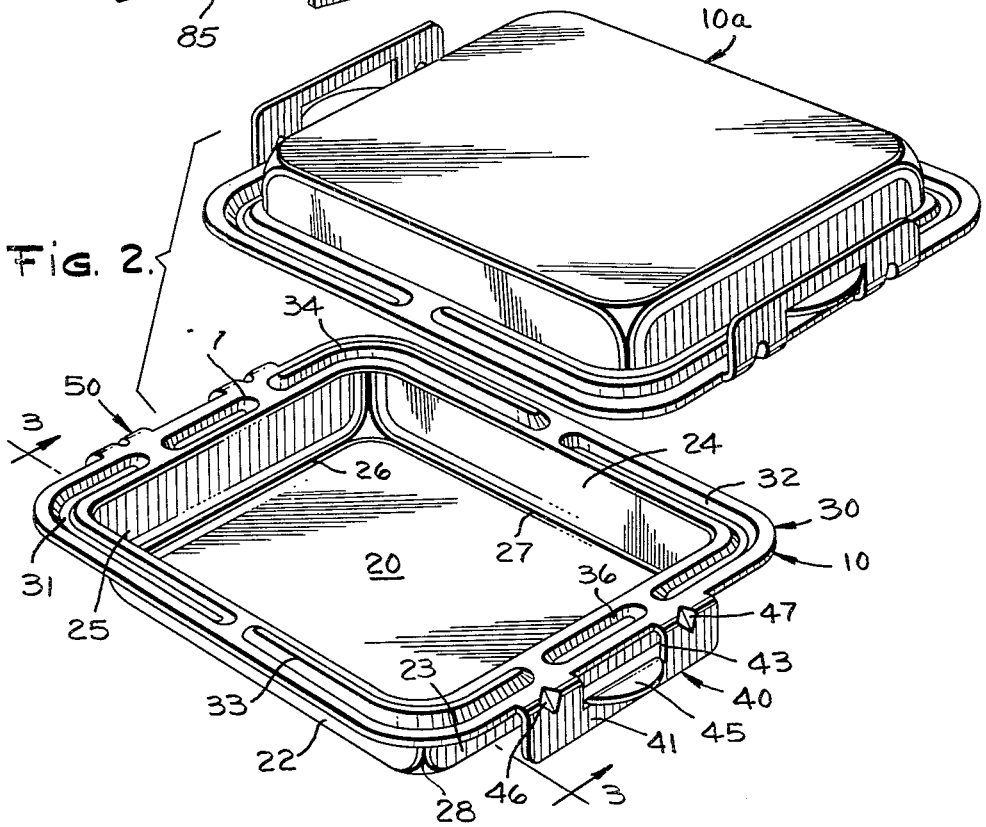
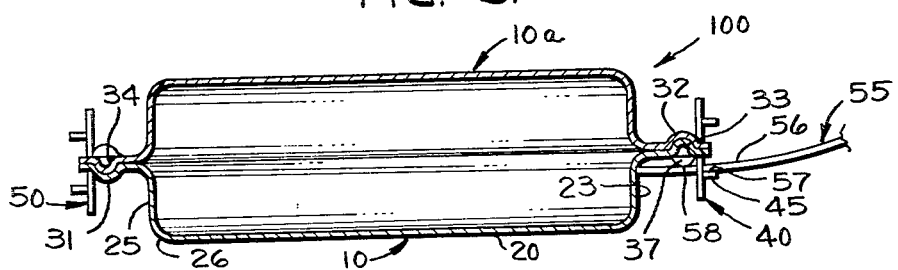

TOASTER/OVEN ACCESSORY PAN WITH HANDLE

BACKGROUND OF THE INVENTION

This invention relates to a toaster/oven accessory pan having a handle which facilitates its handling when hot.

Toaster/ovens can be used advantageously to cook small food items, such as eggs or French toast, through the provision of an accessory cooking container which accepts the small food items, fits into the toaster/oven, and is adapted to enhance cooking of the small food items by the toaster/oven. In copending application Ser. No. 11,329, Feb. 12, 1979, assigned to the same assignee as this application, there is disclosed a toaster/oven accessory cooking container which has a low-mass bottom pan fabricated of aluminum, wherein both the inside and outside surfaces are provided with a dark colored heat-absorptive release coating, preferably black Teflon. A cover for that toaster/oven accessory cooking container is also fabricated of aluminum with black Teflon applied to its inside and outside surfaces, and the cover may be provided with a heat-resistant glass window for admitting radiant heat energy during cooking and for monitoring the result of the cooking operation. The bottom pan has a flat peripheral flange bounded by a lip, and the cover has a flat flange which rests on the flange of the bottom pan in parallel facing relationship within the lip, which prevents the cover from sliding off the pan.

That toaster/oven accessory cooking container has several disadvantages. It is somewhat difficult to handle, particularly when hot. Also, the flat flanges of the bottom pan and cover, when formed of the low mass aluminum which is desirable to achieve the enhanced cooking function, are somewhat weak and prone to bending if abused. Further, the bottom and cover are different in structure and, therefore, require separate manufacture.

SUMMARY OF THE INVENTION

It is a principal object of the invention herein to provide an improved toaster/oven accessory pan.

It is an additional object of the invention herein to provide an improved toaster/oven accessory pan which is easy to handle when hot.

It is another object of the invention herein to provide an improved toaster/oven accessory pan of rigid structure.

It is a further object of the invention herein to provide an improved toaster/oven accessory pan wherein two pans nest together in a bottom/cover relationship to form a closed cooking container.

A toaster/oven accessory pan according to the invention herein comprises a flat major panel, upstanding sidewalls extending generally perpendicularly from the edges of the flat major panel, a peripheral flange extending outwardly from the top edges of the sidewalls, and at least one handle extending from the peripheral flange. A second identical toaster/oven accessory pan according to the invention herein, when inverted, nests with a first toaster/oven accessory pan according to the invention herein to comprise a closed cooking container.

In particular, the peripheral flange of the toaster/oven accessory pan includes L-shaped grooves extending around two diagonally opposed corners thereof and beads extending around the other two diagonally opposed corners thereof, whereby the beads of one toaster/oven accessory pan are received in the grooves of the second identical toaster/oven accessory pan when the toaster/oven accessory pans are nested together to form the cooking container. The beads and grooves also enhance the rigidity of the peripheral flange.

The handle of the toaster/oven accessory pan is adapted to receive a fork for manipulating the toaster/oven accessory pan when it is hot. The toaster/oven accessory pan preferably has two handles, each handle extending perpendicularly from the peripheral flange juxtaposed and centrally located with respect to a sidewall and the two handles being disposed on opposed sidewalls. The handles are each provided with a slot opening for receiving tines of a fork, and the aligned ends of the tines engage against the juxtaposed sidewalls to inhibit pivoting of the pan on the fork. The peripheral flange is provided with a downstruck bead adjacent the slot opening of each handle, which stiffens the peripheral flange in the vicinity of the handle and also engages with the tines of the fork as the fork is used to lift the toaster/oven accessory pan. Each handle is provided with an outturned tab at the edge of the fork receiving slot opening, which stiffens the handle and also provides a grip for lifting the toaster/oven accessory pan, including lifting the toaster/oven accessory pan with an interposed hot pad when it is hot. The toaster/oven accessory pan is preferably fabricated of aluminum, wherein it has low mass, and the inside and outside surfaces thereof are coated with a dark release coating, preferably black Teflon, which enhances the cooking function through rapid heat absorption.

Other and more specific features and objects of the invention herein will in part be obvious and will in part appear from a perusal of the following description of the preferred embodiment and claims, taken together with the drawings.

DRAWINGS

FIG. 1 is a perspective view of a toaster/oven and two toaster/oven accessory pans with handles according to the invention herein nested together to form a cooking container;

FIG. 2 is a perspective view of the two toaster/oven accessory pans of FIG. 1 separated;

FIG. 3 is a sectional view of the two toaster/oven accessory pans of FIG. 1 taken along the lines 3—3 of FIG. 1; and FIG. 4 is a fragmentary side elevation view of the two toaster/oven accessory pans of FIG. 1 being lifted by a fork.

The same reference numerals refer to the same elements throughout the various Figures.

DESCRIPTION OF PREFERRED EMBODIMENT

Two identical toaster/oven accessory pans 10 and 10a according to the invention herein are shown in FIG. 2, and the two pans 10 and 10a are shown assembled together to form a cooking container 100 which is being removed from a toaster/oven 60 with the assistance of a fork 55 in FIG. 1.

The toaster/oven accessory pan 10 comprises a flat major panel 20, which may be the top or bottom of the interchangeably comprised cooking container 100; however, for purposes of description herein the flat major panel 20 will be considered the bottom of the toaster/oven accessory pan 10 and other directions will be referenced accordingly. The toaster/oven accessory pan 10 further comprises upstanding sidewalls 22–25, which are integral with and connect with the flat major panel 20 by rounded transition portions, such as the rounded transition portion 26 between the flat major panel 20 and the sidewall 25, and the rounded transition portion 27 between the flat major panel 20 and the sidewall 24. The sidewalls are also joined at their adjacent edges by rounded corner portions, such as the rounded corner portion 28 connecting sidewalls 22 and 23.

An integral peripheral flange 30 extends outwardly from the tops of the sidewalls 22–25, the peripheral flange 30 being generally parallel to the major panel 20. The peripheral flange 30 defines grooves 31 and 32 which are L-shaped when viewing in plan and extend around diagonally opposed corners of the peripheral flange, groove 31 lying adjacent portions of sidewalls 22 and 25 and groove 32 lying adjacent portions of sidewalls 23 and 24. Raised beads 33 and 34 are also defined by the peripheral flange 30, the beads 33 and 34 also being L-shaped when viewed in plan and extending around the remaining diagonally opposed corners of the peripheral flange. Thus, bead 33 lies adjacent portions of sidewalls 22 and 23 and the diagonally opposed bead 34 lies adjacent portions of sidewalls 24 and 25.

The toaster/oven accessory pan 10 further comprises handles 40 and 50 which are integral extensions of the peripheral flange 30. The handle 40 includes a handle projection 41 extending perpendicularly downwardy from the flange 30 to lie generally parallel to and juxtaposed the sidewall 23, the handle projection 41 also being positioned centrally with respect to the sidewall 23. A slot opening 43, which is preferably generally rectangular, is defined by the handle projection 41 and an outwardly extending semicircular tab 45 is adjacent to and partially defines the slot opening 43. A downstruck bead 36 may be formed in the peripheral flange 30 adjacent slot opening 43 of the handle 40, to provide extra rigidity of the flange in the vicinity of the handle and also for engaging with the tines of the fork, as more fully discussed below. Struck notches 46 and 47 may be provided where the handle projection 41 turns from the peripheral flange 30, the notches providing additional strength for maintaining the handle projection 41 generally perpendicular to the peripheral flange 30. The handle 50 is similar to the handle 40, and is positioned centrally along the sidewall 25 opposite the handle 40 with downstruck bead 37 formed in the peripheral flange 30 adjacent the slot opening of handle 50.

The toaster/oven accessory pan 10 is preferably fabricated of a relatively thin gauge aluminum, wherein it has low mass, and has a dark release coating applied to both the interior and exterior surfaces thereof. A dark release coating is preferably black Teflon (a trademark for polytetrafluorintedethylene). The dimension between the sidewalls 22 and 24 may be approximately four inches and the dimension between the sidewalls 23 and 25 may be approximately four and one-quarter inches wherein the toaster/oven accessory pan 10 is slightly rectangular. Its depth may be approximately three-quarters of an inch.

As best seen in FIGS. 1–3, two identical toaster/oven accessory pans 10 and 10a can be utilized together to form a closed cooking container 100. The toaster/oven accessory pan 10a is placed over the toaster/oven accessory pan 10 with the handles of the respective pans aligned. In this orientation, the beads 34 and 33 of the toaster/oven accessory pan 10a are received in the grooves 31 and 32, respectively, of the toaster/oven accessory pan 10. Similarly, the beads 33 and 34 of the toaster/oven accessory pan 10 are received in the grooves 32 and 31 of the toaster/oven accessory pan 10a. This provides a modicum of sealing between the toaster/oven accessory pans 10 and 10a, and also prevents the toaster/oven accessory pan 10a from sliding off the toaster/oven accessory pan 10. With particular reference to FIG. 3, the engagement between the groove 31 of the toaster/oven accessory pan 10 and the bead 34 of the toaster/oven accessory pan 10a is illustrated, as well as the engagement between the bead 33 of the toaster/oven accessory pan 10 in the groove 32 of the toaster/oven accessory pan 10a.

The toaster/oven accessory pans 10 and 10a, either singly or used together to form the cooking container 100, are particularly useful in cooking small food items, such as eggs and French toast, in a typical toaster/oven 60 illustrated in FIG. 1. The toaster/oven 60 generally comprises a housing 65 defining a cooking chamber 70 therein. The cooking chamber is provided with upper heating elements 72 and 73 and one or more lower heating elements 75. A rack 80 is mounted in the cooking chamber 70, and accessory pan 10 or the cooking container 100 supported on the rack 80, as illustrated in FIG. 1. The toaster/oven 60 further comprises a door 85 for closing the cooking chamber, and knobs, such as knobs 90 and 91, for controlling operation of the heating elements. An important feature of the toaster/oven 60 as it applies to the toaster/oven accessory pans 10 and 10a of the invention herein is that the toaster/oven 60 provides heat from both above and below the cooking container 10.

The toaster/oven accessory pan 10 according to the invention herein achieves relatively rapid cooking rate by virtue of its low mass and black Teflon coating on the outside surface thereof, the black Teflon coating absorbing heat quickly. The toaster/oven accessory pan 10, whether used individually or with the second pan 10a to comprise the cooking container 100, also provides balanced cooking on the top and bottom of food items therein. Of course, it is easy to clean by virtue of the release coating on both its interior and exterior surfaces.

By way of example, the cooking container 100 is particularly well adapted to cook an egg. A raw egg placed in the pan 10 spreads across the bottom 20 into an acceptable serving size. Although the egg may be cooked in pan 10 alone, with balanced cooking of the egg being provided by the pan from the bottom and from radiant and ambient heat from the top, it is preferred to use pan 10a as a cover to retain moisture and prevent drying of the top of the egg. Therefore, the pan 10a is placed on the pan 10 to form the cooking container 100 which is placed in the toaster/oven 60. An additional food item, such as an English muffin, can also be placed on the rack 80 of the toaster/oven 60 adjacent the cooking container 100. The door is closed and the heating elements are actuated. Heat is rapidly absorbed by the cooking container 100, and the egg can be cooked to a desirable degree of doneness in approximately the same time as it takes to toast an English muffin.

By way of further example, the pans 10 and 10a may be used individually to cook such food items as French toast. A piece of bread coated with the seasoned milk-based liquid is placed in the pan 10 and the pan 10 is placed on the rack 80 of the toaster/oven 60, and the heating elements are turned on. The pan 10 absorbs heat rapidly, cooking the bottom surface of the French toast contained therein. Radiant and ambient heat cook the top surface of the French toast at approximately the same rate, wherein balanced cooking between the top and bottom surfaces is achieved and the need for turning the French toast is obviated.

Of course, the toaster/oven accessory pans 10 and 10a, whether used individually or together as the cooking container 100, become hot while cooking food therein. Accordingly, the structure of the toaster/oven accessory pan 10 is adapted for manipulation by a commonly available kitchen utensil, a fork. In particular, a fork 55 has spaced apart tines 56 with aligned ends, and the tines 56 of the fork 55 are inserted through the slot opening 43 in the handle 40 of the toaster/oven accessory pan 10. The fork is inserted in the handle opening in the lower pan when two pans are used together to form the cooking container 100. The tines of the fork bear against the upperside of tab 45, as indicated at 57 in FIG. 3, and also engage the bead 37 adjacent the handle 40, as indicated at 58 of FIG. 3. The aligned ends of the tines 56 of the fork 55 abut against the sidewall 23 adjacent the handle 40, as illustrated in FIG. 4. The typical upward curvature of the fork tines creates a degree of stability in the engagement, and the abutment of the ends of the tines with the sidewall prevents side-to-side pivoting of the toaster/oven accessory pan. The slot and bead are designed so that the fork, inserted right-side-up, extends at a slight upward angle while the toaster/oven accessory pan is maintained horizontal, as would be desired.

In addition, the fork 55 can be inserted in the slot of the toaster/oven accessory pan 10a used as a cover of the cooking container in order to remove the cover. If it is desired not to use a fork for handling the toaster/oven accessory pan 10, the handles 40 and 50 with tabs 45 provide for gripping the cover with a hot pad.

Thus, a toaster/oven accessory pan has been described which admirably achieves the objects of the invention herein. In particular, it is adapted for cooking small food items in toaster/ovens, and identical pans can be used individually to cook food items or can be nested together to form a cooking container for small food items. The toaster/oven accessory pans, whether used individually or nested together as a cooking container, are easily handled with a common kitchen utensil, namely a fork. It will be appreciated that various changes may be made by those skilled in the art, for instance a window can be added to one of the toaster/oven accessory pans if desired so that visual monitoring of the cooking results is permitted, and the scope of the invention is limited only by the following claims.

I claim:

1. A toaster/oven accessory pan for cooking small food items in toaster/ovens, the toaster/oven accessory pan comprising:
   (A) a flat generally rectangular major panel having integral sidewalls extending upwardly therefrom and an integral peripheral flange extending outwardly from and surrounding the top edges of the sidewalls; and
   (B) a handle having a handle projection integral with the peripheral flange, the handle projection extending downwardly from the peripheral flange juxtaposed a first one of the sidewalls, and the handle projection defining a slot opening for receiving the tines of a fork, whereby a fork may be inserted in the slot opening for lifting and carrying the toaster/oven accessory pan, the bottom of the fork tines engaging against the finger projection defining the slot opening, the top of the tines engaging against the peripheral flange and the ends of the tines butting against the sidewall juxtaposed the handle projection.

2. A toaster/oven accessory pan as defined in claim 1 wherein the peripheral flange is provided with a downstruck bead adjacent the slot opening, and the top of fork tines engage with the downstruck bead.

3. A toaster/oven accessory pan as defined in claim 2 wherein the handle has a tab outwardly extending from the handle projection, the tab stiffening the handle projection and at least partially defining the lower edge of the slot opening, and wherein the bottom of the fork tines engage against the tab.

4. A toaster/oven accessory pan as defined in claim 3 wherein the handle is centrally positioned with respect to the adjacent sidewall.

5. A toaster/oven accessory pan as defined in claim 4 and further comprising a second handle identical to the first handle and centrally positioned with respect to a second sidewall opposite the first sidewall, and wherein the peripheral flange is provided with a downstruck bead adjacent the slot opening of the second handle.

6. A toaster/oven accessory pan as defined in claim 5 wherein the major panel and the integral sidewalls are joined by rounded transition portions and the adjacent sidewalls are joined by rounded transition portions, whereby the interior surfaces of the major panel and integral sidewalls are smooth.

7. A toaster/oven accessory pan as defined in claim 6 fabricated of aluminum and having a dark colored release coating applied over the entire surface thereof.

8. A toaster/oven accessory pan as defined in claim 7 wherein the dark colored release coating is black polytetrafluorinatedethylene.

9. A toaster/oven accessory pan as defined in claim 8 wherein the dimension between two opposed sidewalls is about four inches, the dimension between the remaining two opposed sidewalls is about four and one-quarter inches and the depth of the sidewalls is about three-quarters of an inch.

10. A toaster/oven accessory pan as defined in claim 9 and further comprising a second identical toaster/oven accessory pan, the peripheral flanges of the first and second toaster/oven accessory pans being configured to engagingly nest together when one of the toaster/oven accessory pans is inverted to form a cover for the other toaster/oven accessory pan.

11. Two toaster/oven accessory pans as defined in claim 10 wherein the peripheral flange of each toaster/oven accessory pan defines two grooves which are L-shaped when viewed in plan and respectively extend around opposed corners of the peripheral flange and two beads which are L-shaped when viewed in plan and respectively extend around the remaining two opposed corners of the peripheral flange, the beads being configured to nest in the grooves when one of the toaster/oven accessory pans is inverted to form a cover for the other toaster/oven accessory pan.

12. A toaster/oven accessory pan as defined in claim 1 and further comprising a second identical toaster/oven accessory pan, the peripheral flanges of the first and second toaster/oven accessory pans being configured to engagingly nest together when one of the toaster/oven accessory pans is inverted to form a cover for the other toaster/oven accessory pan.

13. Two toaster/oven accessory pans as defined in claim 12 wherein the peripheral flange of each toaster/oven accessory pan defines two grooves which are L-shaped when viewed in plan and respectively extend around opposed corners of the peripheral flange and two beads which are L-shaped when viewed in plan and respectively extend around the remaining two opposed corners of the peripheral flange, the beads being configured to nest in the grooves when one of the toaster/oven accessory pans is inverted to form a cover for the other toaster/oven accessory pan.

* * * * *